United States Patent [19]
Richards

[11] Patent Number: 5,625,925
[45] Date of Patent: May 6, 1997

[54] LINE CONNECTING DEVICE

[76] Inventor: Frank J. Richards, R.R. 290, Gordonville, Tex. 76245

[21] Appl. No.: 589,197

[22] Filed: Jan. 22, 1996

Related U.S. Application Data

[63] Continuation of Ser. No. 92,715, Jul. 16, 1993, abandoned.

[51] Int. Cl.⁶ .......................... F16G 11/04; F16G 11/12
[52] U.S. Cl. .......................... 24/129 B; 24/129 R
[58] Field of Search .......................... 24/129 A, 129 B, 24/129 R, 130, 128; 403/206, 210, 216, 291

[56] References Cited

U.S. PATENT DOCUMENTS

| | | | |
|---|---|---|---|
| 490,250 | 1/1893 | Herrick | 24/129 R |
| 678,533 | 7/1901 | Bancker . | |
| 904,747 | 11/1908 | Anderson | 24/130 |
| 1,205,496 | 11/1916 | Whitehead . | |
| 1,390,152 | 9/1921 | Miltner | 24/129 R |
| 1,421,026 | 6/1922 | Regan | 24/129 R |
| 1,565,041 | 12/1925 | Arney | 24/129 R |
| 1,806,162 | 5/1931 | Hahn . | |
| 1,929,843 | 10/1933 | Gaus . | |
| 2,533,341 | 12/1950 | Alfano | 24/129 R |
| 2,536,159 | 2/1951 | Darkins | 24/130 |
| 3,309,745 | 3/1967 | Gintz | 24/129 R |
| 4,939,820 | 7/1990 | Babcock . | |

FOREIGN PATENT DOCUMENTS

| | | | |
|---|---|---|---|
| 265924 | 8/1963 | Australia | 24/130 |
| 360945 | 5/1906 | France | 24/130 |
| 57207 | 7/1911 | Switzerland | 24/130 |
| 460714 | 2/1937 | United Kingdom | 24/129 B |

Primary Examiner—Timothy Thorpe
Assistant Examiner—William Wicker

[57] ABSTRACT

A line connecting device includes first and second end portions adapted to be connected respectively to first and second line portions for interconnecting the line portions. The connecting device is formed of a rigid, generally planar body. The line connector second portion has an elongated slot of a length at least as great as twice the radius of the second line portion and has second and third slots opening in an opposite direction and extending along respective, mutually diverging axes. In use, the second line portion may be looped twice through the first and second slots and once through the third slot, the first and second slots preferably having substantially constant widths for aligning adjacent loops of line. In one embodiment, the first end portion is of S-shaped configuration having a tang portion which projects generally toward the second end portion of the connector. In one embodiment, the connector is free of line-receiving apertures or eyelets. In a second embodiment, the connector second portion is free of line receiving apertures, and at least one aperture is formed in the shank portion.

11 Claims, 2 Drawing Sheets

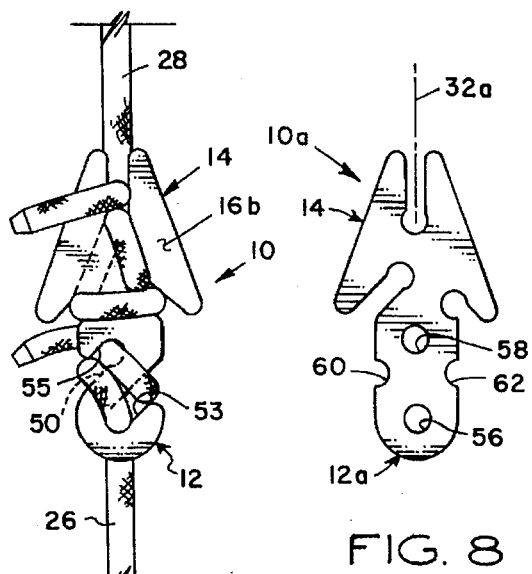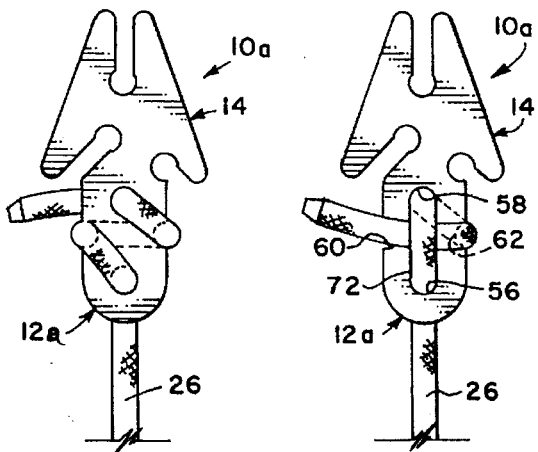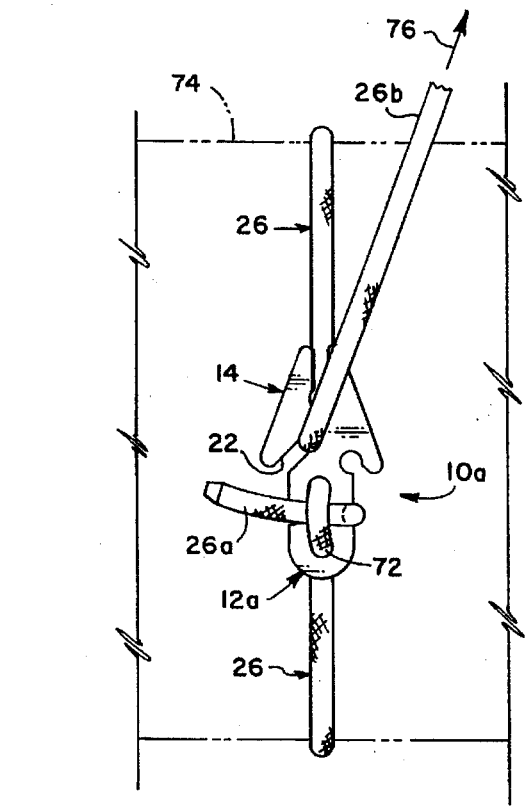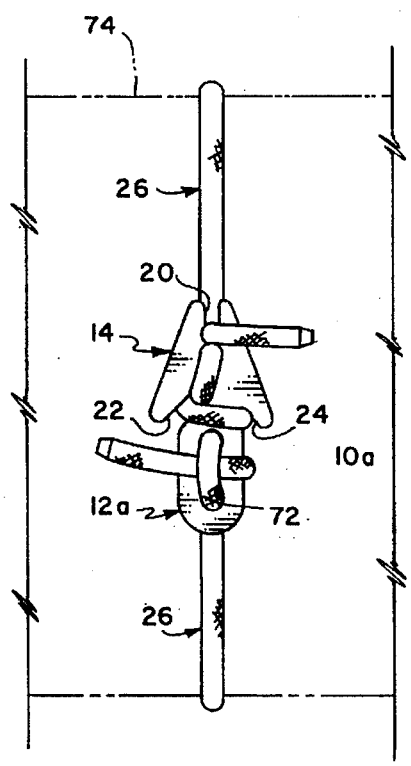
FIG. 7   FIG. 8   FIG. 9   FIG. 10
FIG. 11   FIG. 12

LINE CONNECTING DEVICE

This application is a continuation of application Ser. No. 08/092,715 filed on Jul. 16, 1993, now abandoned.

FIELD OF THE INVENTION

The present invention relates generally to line connecting devices and, more particularly, to a knotless coupler for quickly and releasably interconnecting a pair of lines or line portions.

BACKGROUND OF THE INVENTION

In the past, when it has been desired to interconnect a pair of lines, knots such as square knots or sheet bend knots have traditionally been used. Such knots often tend to tighten and become seized when substantial forces are applied to the lines, whereby untying the knots after a period of use may be difficult and time consuming. Accordingly, it has been sought to develop couplers or cleats for permitting convenient, rapid interconnection of lines of various types, and whereby the lines may be easily released and separated when desired. Such couplers often include one or more apertures and/or wedging notches in which the lines are threaded or engaged. In general, such prior-art connecting devices have either been inconvenient in use, in that they required the user to thread a line into one or more apertures, eyelets or the like or, in other designs, they have been relatively convenient in use but have not provided a secure, slip-free connection between the lines as required in certain applications.

The need for such conveniently usable yet reliable line connectors is of particular importance in marine applications. For example, in sailing vessels, a sailor may desire to quickly fasten various lines or line portions while a vessel is underway. To cite an example, it may be necessary to quickly interconnect a rope looped around a boom and through a reefing grommet or the like in the mainsail for reefing the sail in order to reduce heeling of the boat during stormy weather. As will be appreciated, during such severe weather conditions, the sailor must maintain vigilance with respect to the responses of the vessel to waves and currents and with respect to changes in wind direction and the like. Accordingly, he or she may not be able to devote full attention to the securing of lines in cleats or fastener devices. Thus, it is difficult in such severe environments to thread the end of a line through apertures or eyelets in a connecting cleat, or to loop the line around such apertures. Or, if a connecting device employing wedging notches is employed for receiving the ropes, there is a danger that the ropes may not be properly secured therein or may work themselves loose.

Other applications in which such releasable connector devices are of importance include the connection of lines or ropes for securing cargo to trucks or other vehicles, wherein it is necessary to remove the lines conveniently when the cargo is to be unloaded. Additionally, such connecting devices are employed in various other applications. In general, fastening devices which are convenient to use have not provided secure connections under all conditions, whereas those fasteners which do provide secure connections have been more difficult to use and/or have been difficult to release.

OBJECTS OF THE INVENTION

Accordingly, it is a principal object of the present invention to provide a new and improved connecting device capable of providing convenient, rapid, and secure connection between first and second line portions.

A related object is to provide such a connecting device which provides secure interconnection between adjacent line portions, yet which permits the line portions to be easily disconnected when it is desired to separate the line portions.

Yet another object of the invention is to provide such a releasable connecting device in which the device has at least one end portion which is free of apertures, eyelets, clamps, or the like through which a line must be threaded or looped, wherein the interconnection of adjacent lines may readily be accomplished even under severe environmental conditions, or when visibility is limited.

A still further object is to provide such a connecting device which is particularly adapted for use in marine environments in which connections between lines or line portions must be quickly secured and in which the lines may be slippery from severe weather environments, and wherein the user may be distracted, as when controlling a vessel during severe weather.

Yet another object is to provide such a line connecting device which is of relatively inexpensive and practicable manufacture and well-suited for conventional fabrication processes.

Other objects and advantages of the invention will become apparent from the specification and appended claims and from the accompanying drawing illustrative of the invention.

SUMMARY OF THE INVENTION

The foregoing objects are realized by a line connecting device having a rigid, generally planar body having a first portion adapted to receive a first line portion and a second connector portion, extending in an opposite direction, adapted to receive a second line portion, the second connector portion having first, second, and third slots of respective lengths, widths, and configurations appropriate for securing the second line portion.

The novel features which characterize the invention are defined by the appended claims. The foregoing and other objects, advantages, and features of the invention will hereafter appear, and for purposes of illustration of the invention, but not of limitation, exemplary embodiments of the invention are shown in the appended drawing.

BRIEF DESCRIPTION OF THE DRAWINGS

FIG. 7 is a plan view, similar to FIG. 6, illustrating another method for connecting a line to the shank portion;

FIG. 8 is a plan view of a second embodiment of the connector;

FIGS. 9 and 10 are plan views of the second embodiment illustrating respective methods for connecting the first line to the modified shank portion of the second embodiment;

FIG. 11 is a diagrammatic view illustrating a method for cinching the first line in a loop extending around an object, wherein the line is connected with the connector shank, drawn around the object, and drawn slidingly through the second slot of the connector head portion; and FIG. 12 is a view, similar to FIG. 11, illustrating the finished connection of the first line in the connector head portion, whereby the line is cinched around the object.

DETAILED DESCRIPTION OF THE PREFERRED EMBODIMENT

Figure 1:
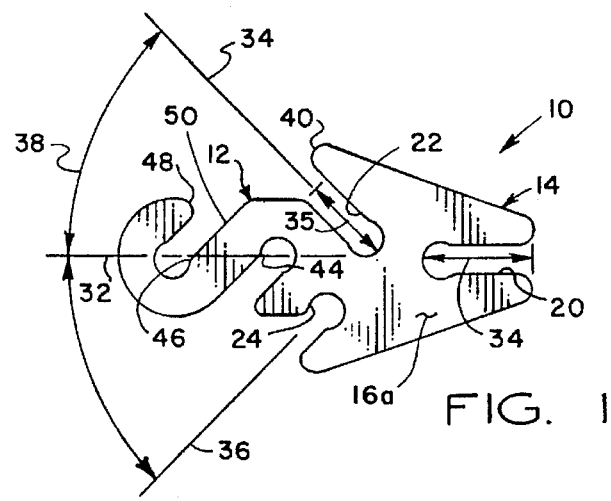
FIG. 1 is a plan view of a first embodiment of the line connector.

In the description which follows, two embodiments of the line connector will be described with reference to the drawings and with respect to the use of the connector for interconnecting flexible lines or ropes as may be employed in a marine environment. It will be appreciated, however, that the line connector is also applicable in other contexts and environments in which various types of ropes, lines, flexible cables or the like are required to be interconnected and subsequently released. Like parts are marked throughout the specification and drawings with the same reference numbers, respectively, and the drawing figures are not necessarily to scale.

Referring now to the drawings, and initially to FIG. 1, a first embodiment of the connector 10 includes a first portion 12, termed hereinafter the shank portion, and a second portion termed the head portion 14, extending generally in an opposite direction. For convenience and clarity of description, the shank portion 12 will be described as extending in a first or rearwardly direction, and the head portion 14 will be described as extending in a second or forward direction. In the illustrative embodiment, the head portion 14 is of generally triangular or "arrow head" configuration, and the shank portion 12 is of S-shaped configuration. As may be seen in FIG. 6, in use, the shank portion 12 is adapted to receive and secure a first line 26 or line portion, and the head portion 14 is adapted to receive and secure a second line 28 or line portion. In one application, to be described hereinbelow with respect to FIGS. 11 and 12, the connector is advantageously employed for cinching a single line which has been looped around an object. In such an application, the head portion is described as being connected to a "line portion", i.e., a portion of the same line which is connected to the shank. In the embodiment to be described with respect to FIGS. 1–6, the connector is described as interconnecting two lines 26, 28. As shown in FIG. 2, the connector 10 is suitably of substantially planar configuration, suitably formed of a sheet of rigid material such as steel, aluminum, plastic or the like, as appropriate for a particular application. In one embodiment suitable for engaging 0.25-inch lines, the connector 10 is formed from 3/16-inch aluminum plate. For convenience and clarity of description, the surface of the connector 10 seen in FIG. 1 and FIGS. 3–6 will be termed the "upper" surface, as also seen in FIG. 2, and the opposite surface 16b (FIG. 2) will be termed the "lower" surface. It should be understood, however, that the connector 10 may be used in any convenient orientation or alignment.

Figure 2:
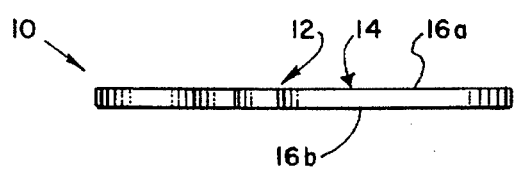
FIG. 2 is a side view of the line connector of FIG. 1.

With primary reference to FIG. 1, first, second, and third slots 20, 22, and 24 are formed in the head portion 14. The first slot 20 extends along a central, longitudinal axis 32 of the connector 10 and opens forwardly, i.e., in the second direction. The length of the first slot 20, as indicated at 34, is necessarily greater than the diameter of the second line 28 (FIGS. 3–6), for reasons which will become apparent from the description to follow, and its width is substantially uniform along its length, and is preferably sufficiently small to constrain the end of line 28 (FIG. 6) when inserted therein. Preferably, the width of the first slot 20 is slightly smaller than the diameter of the second line 28, whereby the line 28 may be snugly fitted and retained within the slot 20, yet readily withdrawn therefrom when it is desired to release the line 28 from the connector 10. The second and third slots 22, 24 open rearwardly and extend along respective axes 34, 36 which diverge outwardly from the longitudinal axis 32. As indicated at 38, the angle by which axis 34 diverges outwardly from the longitudinal axis 32 is suitably 45 degrees or less, the angle 38 being typical of the deviation of both the second and third slots 22, 24. The second slot 22 is necessarily an elongated slot, similar to first slot 20 and also having a length, as indicated at 35, which is preferably greater than twice the diameter of the second line 28, whereby the line 28 may be twice wrapped through slots 20 and 22, as will be described below. Third slot 24 need only be of sufficient length to receive one wrap of the line 28. Accordingly, the head portion 14 is suitably of triangular configuration, having substantially linear first and second slots 20, 22 and having first and second, rearwardly and outwardly divergently extending tangs 40, 42 extending alongside the second and third slots 22, 24.

Rearwardly extending, S-shaped shank portion 12 defines first and second slots 44, 46 and has a forwardly curved tang 48 extending alongside second slot 46. A shank portion 50 extends between slots 44, 46. Preferably, the widths of slots 44 and 46 are equal to or slightly smaller than the diameter of the first line 26.

Figures 3, 4, 5, 6:
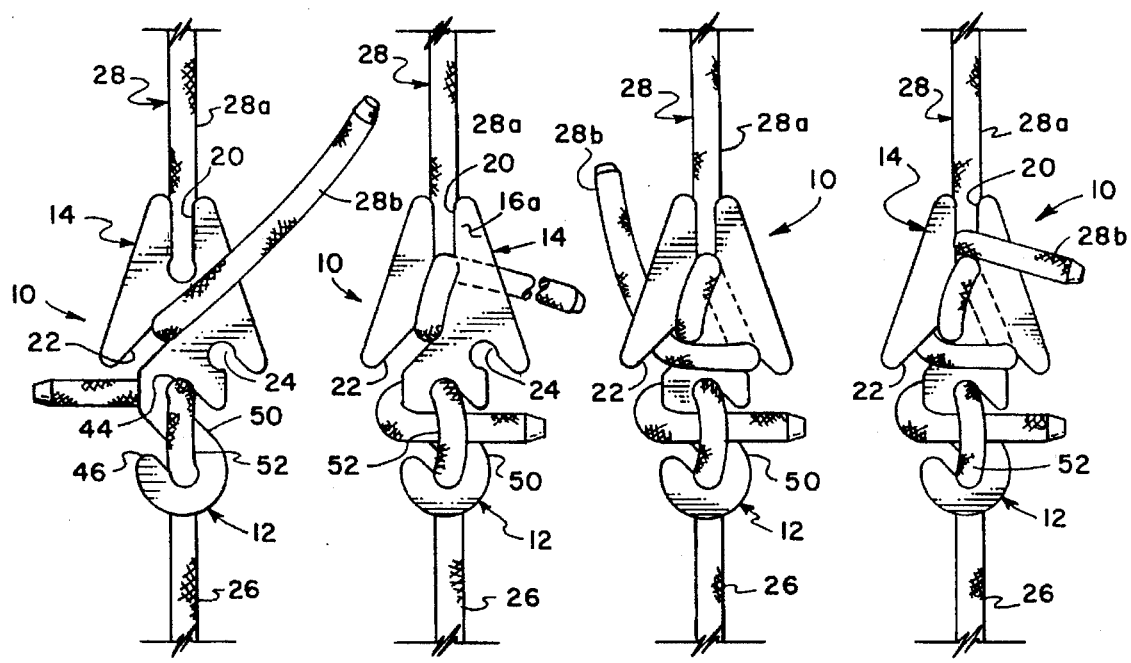
FIGS. 3–6 show the line connector of FIGS. 1 and 2 in a reduced scale and illustrate in sequence the steps of one method for engaging first and second lines thereto.

With respect now to FIGS. 3–6, a first method for connecting lines 26 and 28 to the connector 10 will now be described. With respect initially to the connection of first line 26, as shown in FIG. 3, line 26 is initially looped beneath the shank 12 and upwardly through the second slot 46, over the shank portion 50, and downwardly through the first slot 44, defining a loop 52 (FIG. 3). As seen in FIG. 4, the tip of line 26 is then looped laterally around and over the shank portion 50 and under the loop 52. When tension is applied to the first line 26, the loop 52 is tightened, thereby securing the line in place. If desired for additional security or when the lines are wet, the tip of line 26 may be looped around the shank and under loop 52 a second time. In a typical application, line 26 is engaged with the shank 12 prior to the connection of the second line 28 to the head portion 14, and, as desired, it may remain affixed to the shank during subsequent connections and removals of the second line 28. It is thus normally intended that line 26 may remain securely attached to the shank portion 12, permitting the interconnection of the two lines to be accomplished merely by connecting the second line 28 to head 14, which may be done rapidly and conveniently.

Referring still to FIGS. 3–6, the connection of the second line 28 to the head portion 14 of connector 10 will now be described. The line 28 is initially aligned with and under the head portion 14, and drawn first through the second slot 22, as shown in FIG. 3. Referring additionally now to FIG. 4, second line 28 is then looped over the upper surface 16a of the head portion 14, and then drawn downwardly within the central, first notch 20, as shown in FIG. 4. Referring to FIG. 5, second line 28 is then drawn rearwardly and upwardly through the third slot 24, then laterally across the base of head portion 14, and then drawn downwardly through the second slot 22, as shown in FIG. 5.

Referring to FIG. 6, the end portion 28b of line 28 is then extended forwardly under the head portion 14 and drawn upwardly through the first slot 20. Because the slot 20 is sufficiently narrow to engage and constrain the second line, and is preferably slightly more narrow than the diameter of the second line 28, the end portion 28b of line 28 tends to remain in place within the slot 20. Additionally, upon lines 26, 28 being pulled in opposite directions, applying tension upon the connector 10, the portion 28a of line 28, as shown in FIG. 6, is caused to bear against the portion of line 28 which has been looped under the head portion 14 between slots 22 and 20, as just described, thereby constraining line 28 against the lower surface 16b of head portion 14 and tending to prevent its release, so long as tension remains on the two lines. Similarly, such tension tends to tighten the loop portion 52 and thereby constrain the distal portion of the first line 26 beneath the loop portion 52, as seen in FIG. 6. Tension on second line 28 is primarily exerted against the inner, closed end of the second slot 22, which comprises means for sustaining a substantial part of loads exerted by the second line.

Whereas the above-described method of engagement of second line 28 is preferred, particularly in applications in which the secure interconnection of the lines is of importance even during severe environmental conditions, e.g., when the lines have become slippery due to moisture or the like, alternative attachment methods may be used in other applications. Thus, when a secure connection is not critical, and when it is desired to provide connection quickly and with minimal effort, the second line 28 need not be wrapped a second time through the first slot 20 as in FIG. 6, but instead may remain engaged as shown in FIG. 5, or even as shown in FIG. 4, wherein it is looped only thorough the first and second slots 20, 22, since the pressure exerted by the second line 28 against the line 29 extending under the head portion 14 is sufficient to retain line 28 in place, albeit not with the same degree of security and slip resistance as in the arrangement illustrated in FIG. 6. Thus, it may be desired to loop the line 28 over the head portion 14 and through first slot 20 only once, as shown in FIG. 4, if a quick, temporary, and/or non-critical connection is desired.

With reference now to FIG. 7, a second method for engaging the first line 26 with the S-shaped shank portion 12 is illustrated in which the lower surface 16b of the connector is visible in the drawing. Line 26 is initially drawn through lower slot 53, over the S-shank 50 and through upper slot 55, then wrapped around S-shank 50 and drawn through upper slot 55 a second time.

It will now be seen that the connector 10 permits convenient yet secure connection between first and second lines 26, 28. The use of forwardly open first slot 20, and rearwardly opening second and third slots 22 and 24, permits rapid and secure connection of the second line 28 to the head portion 14. Additionally, the S-shaped shank portion 12 permits rapid and secure connection between the shank portion and the first line 26. In the preferred embodiment wherein the lengths of first and second slots 20, 22 are greater than, and preferably twice as great as, the diameter of the second line 28, rapid yet secure connection with the second line 28 is provided.

With reference now to FIG. 8, a second embodiment 10a of the connector will now be described. In the second embodiment 10a, head portion 14 remains the same as described above with respect to the embodiment of FIGS. 1–7. The shank portion 12a is of a different configuration and is intended for applications in which it is desired to securely engage first line 26 with the shank. As may be seen in FIG. 8, the second embodiment 10a includes an elongated, slab-like, linearly extending shank body portion having first and second apertures 56, 58 formed therethrough and mutually spaced along the central, longitudinal axis 32a of the connector 10a. Apertures 56, 58 are of respective diameters preferably slightly larger than the diameter of first line 26. Additionally, first and second, semi-circular notches 60, 62 are respectively formed in the opposite sides of the shank portion 12a and vertically aligned between the apertures 56, 58. In use, and as illustrated in FIG. 9, first line 26 is initially extended under the shank portion 12a and drawn upwardly through the first aperture 56. It is then wrapped over and around the first notch 60, under the shank and around the second notch 62 as seen in FIG. 9, and subsequently passed downwardly through the second aperture 58, as shown in FIG. 9. Accordingly, although the embodiment of FIGS. 8–10 is somewhat less convenient in use than the embodiment of FIGS. 1–7, it is particularly suited for applications in which it is desired to connect the first line 26 to the shank 12a in a secure manner, whereby the connection to the head portion 14 may then be made at a later time without concern that the first line 26 might somehow loosen or become dislodged from the shank portion as the lines 26 and connector 10a are handled.

Referring now to FIG. 10, another method of attaching first line 26 to the shank portion 12a of the second embodiment is illustrated in which the line 26 is initially drawn upwardly through first aperture 56 and then downwardly through second aperture 58, thereby defining a loop 72 extending between the two apertures 56, 58. Line 26 is then wrapped laterally and upwardly and around notch 62, seated in notch 62, and drawn transversely under the loop 72. Accordingly, when tensional forces are applied to line 26, loop 72 is tightened against the portion of line 26 which has been extended beneath loop 72, thereby securing the line 26. As in the method described with reference to FIG. 9, the semi-circular notches 60, 62 (FIG. 11) serve to secure the looped-around portion(s) of line 26 and to reduce lateral projection on either side of shank 12a, thereby minimizing the possibility that the line 26 could become snagged against an adjacent structure during handling. Again, the head portion 14 is adapted to be quickly yet securely connected to a second line, in the manner described above with reference to FIGS. 1–6, or to a portion of the same line, as will now be described with reference to FIGS. 11 and 12.

Referring now to FIG. 11, a slip loop application of the connector is illustrated in which the connector is utilized for connecting portions of line 26 to form a cincture encircling a structure 74. For purposes of illustration, structure 74, in the present embodiment, may be considered a portion of the boom of a sailing vessel having adjacent thereto a reefed portion or "slab," not shown, of the mainsail extending therealong, wherein it is desired to form a loop of line 26 around the boom for securing the reefed portion of the sail to the boom. The end portion 26a of line 26 is retained in the connector shank portion 12a, engaged in the manner described above with reference to FIG. 10.

When it is desired to cinch the line 26 around structure 74, the connector 10a is placed in transverse alignment against a portion of the structure, as illustrated in FIG. 11, and the free portion of line 26 is wrapped circumferentially around the structure 74, extended under the connector head portion 14, and drawn upwardly through the second slot 22. The base or closed end portion of the second slot 22 serves as a bearing surface means whereby the line 26 may be circled tightly around structure 74 by pulling line portion 26b forwardly, e.g., as indicated by arrow 76. Line portion 26b is then wrapped under the head portion 14 and successively engaged in slots 20, 24, 22, and 20, as described above with reference to FIGS. 4–6, thereby tightly securing the looped line 26.

In the just-described procedure, once the line 26 has been looped around the structure 74 and drawn through second slot 22, as seen in FIG. 11, the remaining procedure is conveniently performed with only one hand, since the connector 10a is constrained against the structure 74 by the tension of line 26. Accordingly, the connector (10 or 10a) is convenient in use, since the operator is not required to thread the line through apertures, eyelets, or the like as in prior-art connectors. Such convenience may constitute a significant advantage for certain applications, as in a marine environment wherein a sailor may be working on a moving vessel or under severe environmental conditions, wherein he may have to steady himself with his other hand as the vessel pitches and rolls.

It will now be understood that the line connector of the present invention is adapted to permit convenient, rapid, yet secure interconnection between first and second lines or line portions. The connection between a line or line portion and the connector head portion 14 is conveniently made even in severe weather or environmental conditions, since the connector does not require the insertion of a line or line portion through one or more apertures or eyelets formed in the head 14, but, in contrast, merely requires that the line be drawn through at least the second and first slots. As described above, upon tension being applied to the lines, their connections to the line connector are made more secure by the pressures exerted against the looped line portions. Moreover, even in applications in which very high tensional loads are applied to the lines, the lines may be easily and quickly released from the connector 10 after use.

Whereas only two embodiments, together with modifications thereof, have been shown and described in detail, other embodiments and forms of use will be apparent to those in the art from the above description. For example, it may be desired in some applications to form the shank portion in the same manner and configuration as the head portion 14, i.e., to use dual, oppositely directioned head portions, not shown, each having three slots, such as slots 20, 22 and 24 as shown in FIGS. 1–7. In such an embodiment, the first line 26 is engaged within the second head portion in the same manner as has been described with respect to the engagement of the second line 28 and the head portion 14, FIGS. 3–7. Whereas several methods for engagement of the lines, or line portions, to the head portion and shank portion have thus been disclosed, various further methods of attachment, and further applications of the connector, will be suggested by the above disclosure to those skilled in the art. Accordingly, the present description is not intended to be construed in a limiting sense, and it is intended that the appended claims encompass any such further modifications or additional embodiments.

What is claimed is:

1. A line connector, having a central, longitudinal axis, for interconnecting first and second line portions, comprising:

a first connector portion having extension in a first direction along the longitudinal axis and comprising means for receiving the first line portion;

a second connector portion having extension in a second, opposite direction and comprising means for receiving the second line portion, the second connector portion having a first slot opening in the second direction and second and third slots opening in the first direction and diverging outwardly relative to each other, the width of at least the first slot being substantially uniform, the respective lengths of each of the first and second slots being greater than the length of the third slot, the line connector comprising means for connecting the first and second line portions, under tension, in alignment with the line connector longitudinal axis and parallel to the first slot.

2. The line connector of claim 1, wherein the length of the first slot is at least as great as twice the diameter of the second line portion, and wherein its width is at least as small as the diameter of the second line portion, the first slot comprising means for constraining a portion of the second line portion inserted within the first slot.

3. The line connector of claim 1, wherein the shank portion is of an S-shaped configuration.

4. The line connector of claim 3, wherein the shank portion defines slots of respective widths at least as small as the diameter of the first line portion.

5. A line connector, having a central, longitudinal axis, for interconnecting first and second line portions, comprising:

a first connector portion having extension in a first direction along the central longitudinal axis of the connector and comprising means for receiving the first line portion;

a second connector portion having extension along the central, longitudinal axis of the line connector in a second, opposite direction and comprising means for receiving the second line portion, the second connector portion having a first, linear slot, extending substantially parallel to the central, longitudinal axis, unobstructed and open in the second direction, for receiving the second line portion, and second and third slots unobstructed and open in the first direction, for receiving the second line portion, and diverging outwardly relative to the longitudinal axis, the inner end of the second slot having a bearing surface substantially in alignment with the longitudinal axis, and comprising bearing means for slidingly receiving the second line portion during cinching of the first and second line portions under tension, upon the second line portion being passed through the second slot and drawn back from the inner bearing surface adjacent the connector in the second direction for applying tension to the connector along its longitudinal axis, the width of at least the first slot being substantially uniform the first slot being sufficiently narrow to engage and retain the second line portion.

6. The line connector of claim 5, wherein the length of the first slot is greater than the diameter of the second line portion.

7. The line connector of claim 6, wherein the respective lengths of each of the first and second slots are greater than the length of the third slot.

8. The line connector of claim 5, wherein the respective lengths of the first and second slots are at least twice the diameter of the second line portion.

9. The line connector of claim 5, wherein the width of the first slot is less than the diameter of the second line portion.

10. The line connector of claim 5, wherein the second slot has an inner, slip bearing terminal portion comprising means for sustaining loads exerted by the second line portion, upon the first and second line portions being secured to the line connector and drawn in opposite directions.

11. A line connector having an elongated body, comprising:

a shank portion extending in a rearward direction along the longitudinal axis of the line connector and comprising means for receiving a first line portion;

a head portion extending in an opposite, forward direction along said longitudinal axis and comprising means for receiving a second line portion, the head portion having a first, elongated slot extending along the longitudinal axis with substantially uniform width, unobstructed and open forwardly for receiving the second line portion, and second and third slots opening rearwardly, the second slot extending along an axis defining an acute angle with the line connector longitudinal axis, the first and second slots being aligned, relative to the longitudinal axis, so that upon the second line portion being successively drawn rearwardly beneath the head portion, upwardly through the second slot, forwardly over the head portion, and downwardly through the first slot, the first slot aligns the line passed downwardly through the first slot with the line extending rearwardly beneath the head portion, whereby the line passed downwardly through the first slot is frictionally restrained by pressure exerted by the second line portion against the line extending through the first slot.

* * * * *